Aug. 22, 1967  S. E. KAPPE  3,337,449
WASTE TREATMENT PROCESS AND APPARATUS
Filed June 8, 1964  2 Sheets-Sheet 1
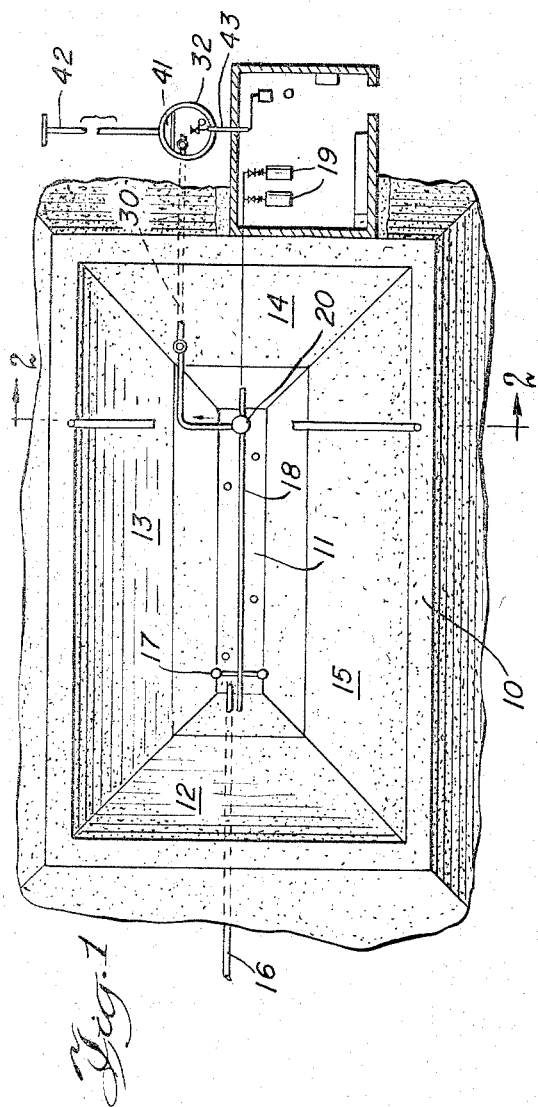
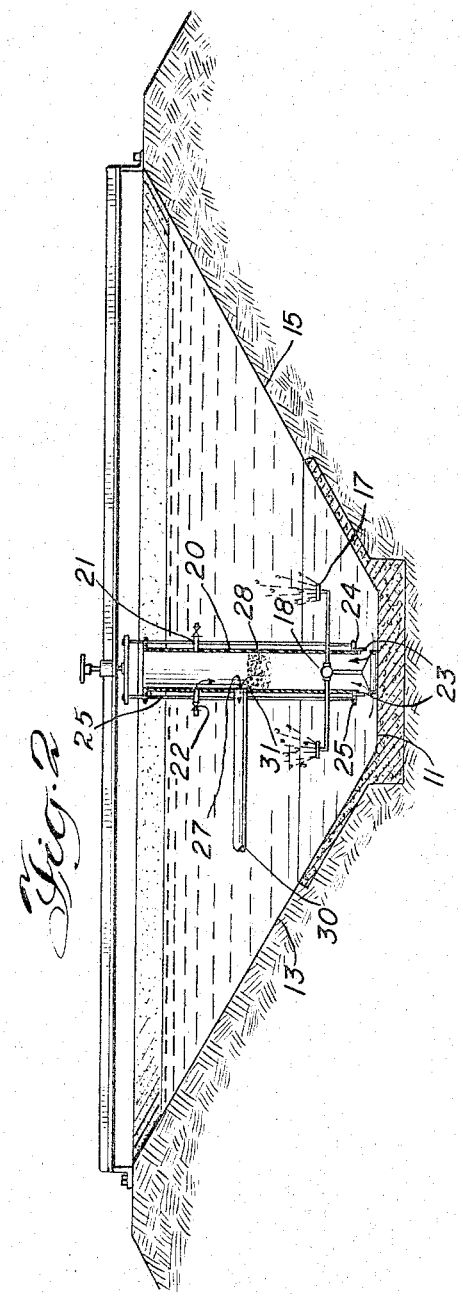
INVENTOR.
Stanley E. Kappe
BY
Dressler, Goldsmith, Clement, Gordon & Lodd
ATTORNEYS.

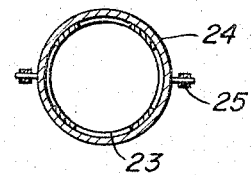
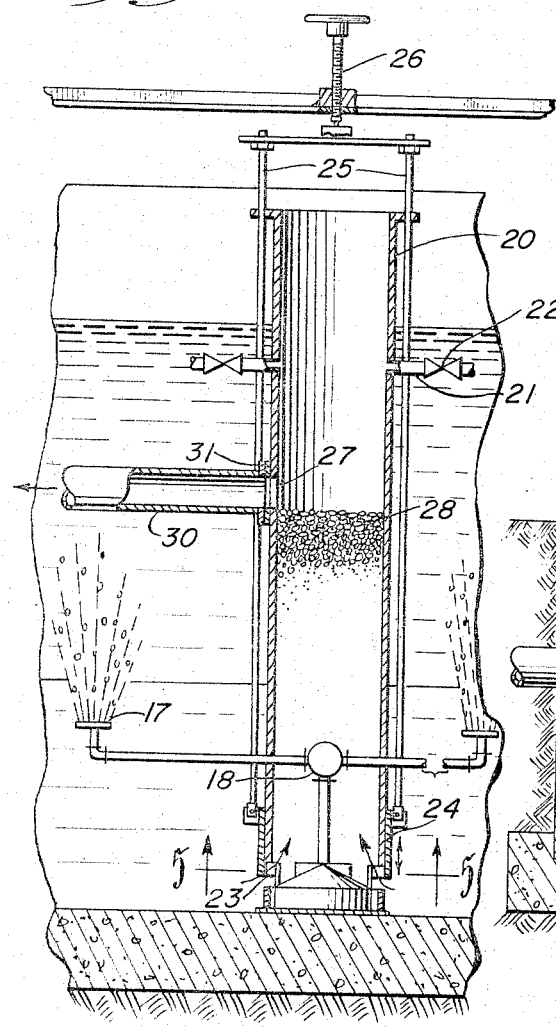
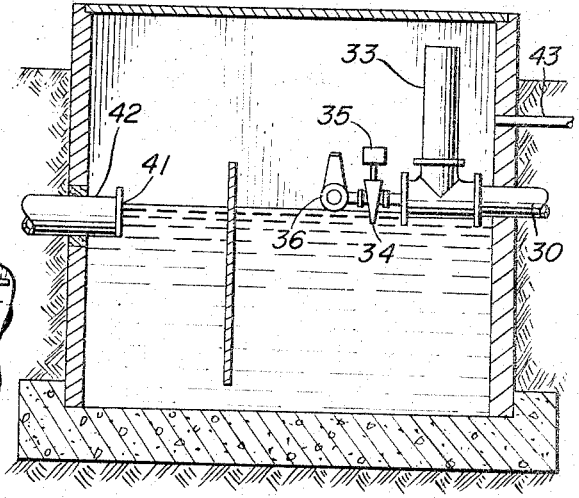

United States Patent Office 3,337,449
Patented Aug. 22, 1967

3,337,449
WASTE TREATMENT PROCESS AND APPARATUS
Stanley E. Kappe, Montgomery County, Md., assignor to FMC Corporation, a corporation of Delaware
Filed June 8, 1964, Ser. No. 373,304
10 Claims. (Cl. 210—15)

This invention relates to the treatment of waste materials. More particularly, it relates to apparatus and to a system for the processing of relatively small quantities of sewage to a high degree of purification.

Briefly, the process of this invention comprises establishing a mixture of liquid and sludge in an accumulation zone for sewage, introducing sewage into said zone to form a mixed liquor therein, passing air into said mixed liquor in said zone in quantities to effect at least a partial flocculation of solid matter, withdrawing a clarified liquid to a segregated space submerged in the liquid within said accumulation and aeration zone and discharging clarified liquid from the system by withdrawal from said segregated space.

Plants of a size for the treatment of sewage from such individual installations as schools, restaurants, office buildings, housing developments, camps, etc., have not been looked upon with favor because they were too costly to build, considering their capacity, and to maintain and to operate. The common alternatives have been septic tanks and tile fields.

Use of the common alternatives is today discouraged by public health regulatory agencies as means of sewage disposal because untreated sewage may find its way to the ground surface and the liquid portions thereof seep into surface and underground water streams, thus creating public health menaces.

The sewage treatment plants heretofore suggested for replacement of the septic tanks, etc., have been adaptations of larger sewage plants cut down in volume. Such plants have not been reduced in functional components, in the need for trained operators, in the relatively high power costs, or in maintenance expense, and the like Now it has been discovered that sewage from installations where periodic flow rates are high but the total daily flow is relatively small can be processed in a simplied and improved operation and that new plants having improved operating characteristics may be built giving highly efficient aerobic treatment by the combining of aeration tank, sedimentation tank and digestion tank into a single unit. These treatment units will handle either raw domestic, or raw industrial waste with or without primary settling.

The process for treating sewage in accordance with this invention comprises establishing a mixture of liquid and sludge in an accumulation zone for sewage, the lower portion of said zone having a volume sufficient for complete containment of settleable sludge and the upper portion thereof having a volume less or greater, but preferably at least equal to the daily average flow of sewage, accumulating the flow of sewage in said zone, said sewage solids being introduced in a suspendable particle size to form with the liquid and sludge therein a mixed liquor, passing air into the contents of said zone, i.e., mixed liquor, during the period of accumulation of at least the major portion of the sewage in quantities sufficient to effect at least partial flocculation of solid matter, periodically or continuously segregating a claried effluent in a segregated space submerged within said accumulation and aeration zone and discharging clarified effluent from the segregated space for final disposal on a continuous or intermittent basis.

More in detail, in one mode of operation the process of treating sewage comprises introducing sewage into an accumulation zone which is a combination aeration-settling zone in which the lower portion of the zone is adapted to be an accumulation hopper for settled sludge during periods when no gas or air is being introduced. During such periods of quiescence, withdrawal of a clarified supernatant is provided by a series of controls interlocked to insure that air is not discharged into the system while the valve system for withdrawal of supernatant is in open position.

Such interlocking controls may be adapted for periodic discharge of clarified effluent, at any predetermined interval of time or may provide for discharge of effluent only during the period of minimum or no accumulation of sewage, i.e., between, for example, midnight and 5 A.M., in the case of an average day camp, hotel, etc.

Sewage in suspendable form is accumulated in the combination aeration and settling zone and aeration effected on a continuous or intermittent basis during the period of accumulation of a major portion of the sewage.

Air is introduced into the body of mixed liquor to effect aeration in quantities to produce substantially complete reduction in biological oxygen demand, although it will be recognized that aeration in the presence of sufficient sludge solids to sustain biological activity may be continued for periods sufficient to accomplish B.O.D. removals of the order of 50% to 80%.

When aeration is determined to have proceeded to a desired degree, drawoff of liquid may be carried out with or without settling of sludge. If it is desired to remove clarified supernatant, settling may be carried to the point where inlets to the conduit forming a segregated space are situated in clarified supernatant liquor. Drawoff of supernatant may be through a conduit of short length closed at the bottom to form a segregated space and adapted with a float which positions the segregated space at or adjacent the fluctuating liquid level in the tank. Such a floating conduit maintains the inlet to the segregated space always in the vicinity of the surface of liquid in the tank. Alternatively, drawoff of supernatant may be through a fixed conduit or standpipe with inlet communicating with said conduit for permitting flow of clarified liquid from the upper portion of said treatment zone into the segregated space. In a further modification, the drawoff may be made through ports communicating with a portion of the zone where there is sludge, said ports being adapted to take liquid at such a rate as to use the sludge to effect a partial filtration. In order to provide considerable flexibility, a fixed conduit may be provided with inlets communicating both with the supernatant zone and with the zone where there is sludge. A strainer or filter, on which bacterial growth may or may not be developed, may be used to complete clarification of the effluent being taken into the segregated space.

In another embodiment of the process wherein the influent sewage is being accumulated and it is desired for any reason, such as the volume of influent exceeding the capacity of the tank or the influent flow does not have an appreciable fall-off in volume during any particular period of the day, aeration may be carried on continuously. In order to compensate for the volume of inflowing sewage, effluent may be discharged not at the ingoing rate as is standard procedure, but on a continuous basis.

Inasmuch as aeration maintains sludge and floatable material in suspension, the withdrawal of effluent is accomplished at a very low rate on a continuous basis. Such a rate may be determined by the area through which the liquid is being withdrawn to produce a velocity which is too low to maintain matter in suspension. In order to insure that suspendable matter does not become entrained and carried out with the liquid which is to be discharged, a strainer or suitable filter medium is inserted between the inlet from the tank and the outlet from the segregated space formed within a standpipe. This filter will remove any matter, particularly fines, which may be entrained at the inlet to the standpipe.

Apparatus designed to carry out this process includes a tank, container, basin, or even a sump dug in the earth which may be of any desired configuration. Sewage enters this container, generally adjacent the upstream end and in the vicinity of the area of introduction of air, which air creates turbulence and circulates the tank contents.

Aeration may be accomplished by positioning at or adjacent the bottom of the treatment zone one or a series of diffuser elements positioned along either or both lateral walls, or at intermediate points between the walls. The diffusers may be of any type varying from an open pipe to diffusers of a coarse bubble type, fine bubble type, etc., for example, perforated plastic tubing, perforated metal tubing with or without rope, or cord winding, or the like.

At a point removed from the sewage inlet, there is provided an effluent removal conduit or standpipe, suitably positioned to receive effluent, i.e., horizontally or angularly positioned but preferably vertically positioned. Effluent is accumulated within the conduit and removed through an outlet port and associated piping. When the conduit is a vertically positioned standpipe, the outlet port may be positioned intermediate vertically spaced independently operable liquid inlet ports. One set of inlet ports is positioned to communicate with the portion of the contents of the tank in which solids accumulated during settling. The second set of ports communicates with the portion of the tank which contains the supernatant liquid when quiescence has allowed the solids in the tank to settle, in which event the clarified supernatant simply is accepted within the standpipe. Mounted within said standpipe between the outlet and the lower disposed set of inlet ports is a strainer or filter of suitable material.

Said filter medium may consist of a cartridge insertable into a fixed position and filled with suitable filter mediums such as pieces of water-insoluble plastic, rocks, etc., on which bacterial growth may be sustained or floating aquatic growth with long submerged roots, such as water chestnut plants, etc. The strainer may also be constructed of a material of a density causing it to float in the liquid below the liquid outlet in the conduit, or it could be restrained to float at a certain level by such means as wire gauze, cheese cloth, and similar barriers. The clarified effluent accumulating at the outlet from the standpipe may be discharged to a conventional chlorine contact tank. Chlorinated effluent is discharged from the tank to a stream, etc.

If the treatment unit has an integral grit chamber for removal of heavy solid matter from a flowing liquid stream of sewage, this chamber segment is of such volume as compared with the flowing liquid stream as to maintain a suspension flow velocity from which the grit may settle by gravity. A grit chamber may also be aerated. Air, in this situation, is usually introduced along a wall of the tank so as to circulate air-liquid mixture in a generally vertical plane, the air being introduced in volumes so as to maintain organic material in suspension and to allow heavy inert material to settle out.

The new process of sewage treatment and the apparatus adapted to carry out the process will be apparent to those skilled in the art from the following description of a preferred embodiment thereof taken in conjunction with the accompanying drawing, in which:

FIGURE 1 is a top plan view of the treatment tank; and

FIGURE 2 is a sectional view along the line 2—2 of FIGURE 1;

FIGURE 3 is a cross-sectional view of the chlorination tank;

FIGURE 4 is an enlargement of the conduit in section; and

FIGURE 5 is a transverse view of the conduit showing the closure means for the bottom ports.

Referring more particularly to the drawings, the numeral 10 indicates an elongated tank illustrated as having a floor 11 of relatively small area compared to the surface area of the liquid in the tank and sloping side walls 12, 13, 14 and 15. Tank 10 is provided with an influent conduit 16. Raw sewage, or the like, may be delivered from a screening station through this influent conduit.

Tank 10 is provided with suitable aeration means 17, such as gas diffusers, suspended one to three feet above the floor 11. The diffusers are generally supported as illustrated, from a head 18. Gas or air is fed to the diffusers through conduit 18 from gas blowers 19 capable of developing pressures up to 10 pounds per square inch gauge, such blowers being conventional equipment not requiring detailed illustration.

Adjacent the downstream wall 14 of tank 10 is positioned a standpipe unit 20. Effluent is removed through this standpipe unit. As shown in FIGURES 2, 4 and 5, standpipe unit 20 is provided with liquid inlets 21 adapted with liquid flow control means 22, such as valves. Standpipe unit 20 is also provided with inlet ports 23 adapted with suitable closure means such as a plate 24 vertically adjustable by means of rods 25 connected to an adjusting screw 26.

Intermediate inlets 21 and inlet ports 23, the standpipe 20 is provided with a port 27 communicating with the interior of the standpipe unit. A conduit 30 is joined to said standpipe 20 by suitable means 31 as by welding, or by an internally threaded collar so as to communicate with the interior of said standpipe through said port 27. Positioned in said standpipe 20 is a filter medium 28.

Conduit 30 is adapted to deliver effluent to a chlorine contact tank 32 illustrated in FIGURE 3. Conduit 30 passes through the wall of tank 32 and the passage rendered liquid tight as by a suitable gasket. Conduit 30 communicates within the tank 32 with an automatic overflow device 33, such as a riser pipe. Secured to the outlet end of conduit 30 is liquid flow control means 34, such as a valve adapted for control by suitable means 35, such as a motor. The outlet from conduit 30 may also be provided with suitable means 36 for control of flow which is manually operable.

Effluent removal from chlorine contact tank 32 is provided through an overflow V notch weir 41 which discharges the chlorinated liquid into an effluent channel or pipe 42.

Chlorine is introduced into the tank through pipe 43 in the form of water solution as per conventional manner.

In the operation of this apparatus, the operation is interlocked so that valve 34 can be in closed position when the blowers are activated and conversely valve 34 can be opened when the blowers are inactivated.

Under this intercontrol system, the blowers discharge air through the diffuser means to aerate the tank contents, to mix the waste in the tank and to furnish oxygen for the aerobic treatment of the wastes in the tank. Shutting down the blowers creates substantially quiescent conditions in the tank 10 and allows material and bacterial growth in suspension in the tank liquid to settle by gravity to the bottom of the tank and leave a clear supernatant thereabove.

At predetermined intervals after blowers 19 ar shut down by automatic time devices, the timing devices will automatically actuate motorized valve 34 to open position allowing effluent to discharge at a pre-set controlled rate. Valves 34 and 36, singly or in combination, are set to control the rate of discharge of effluent into the chlorine contact tank where sterilization of treated sewage may be required by public health regulations.

It can be seen that operating in the manner described, eliminates much of the expensive pumping equipment, piping, valving, etc., because there is no need to circulate sludge from one tank to another. The operation is automatic, eliminating need for skilled operators to accomplish storage and purification of wastes during high flow periods and automatic clarification and discharge during low or zero flow periods.

The above-detailed description of this invention has been given by way of illustration without any intention that the invention be limited to the exact conditions set forth. No unnecessary limitations should be understood therefrom, as modifications will be obvious to those skilled in the art.

I claim:

1. Apparatus for the treatment of sewage comprising a container for holding a mixture of sludge, sewage and liquid, said container having a bottom portion providing a volume sufficient for complete containment of settleable sludge and an upper portion providing a volume for handling sewage being introduced into said container, means through which sewage is introduced into said container and means through which liquid is discharged from said container, said discharge means comprising a substantially vertical conduit positioned within said container extending above the normal liquid level in said container and open to the atmosphere, said discharge means having an inlet thereto positioned remote from the point of introduction of sewage into said container and spaced from the open to the atmosphere end of said conduit for permitting flow of liquid into said conduit from within said mixture in said container whereby a common level is maintained for liquid inside and outside said conduit, an opening in said conduit at a point intermediate said normal liquid level and said inlet, outlet piping in direct flow communication with the interior of said conduit through said opening, said point of communication being positioned to be continuously submerged in liquid segregated within said conduit, filter means positioned in said conduit intermediate said opening and said inlet and means for introducing air into said mixture in said container at a point exterior of and spaced from said conduit.

2. Apparatus according to claim 1 which includes spaced inlets on opposite sides of said outlet from said conduit.

3. Apparatus according to claim 2 in which the inlets to said conduit are positioned above and below the outlet from said conduit and filter means is positioned in said conduit intermediate said outlet and said inlet below said outlet.

4. Apparatus according to claim 1 which includes liquid flow control means in said outlet piping adapted to maintain a rate of liquid flow insufficient to entrain sludge solids.

5. Apparatus according to claim 4 which include actuating means for said flow restricting means, means for moving air to said means for introducing air into said mixture, control means for alternately actuating the means for moving air to said means for introducing air into said mixture when said flow restricting means in said piping is in the closed position and for deactivating said actuating means for moving air when said flow restricting means is in the open position.

6. A process for treating sewage which comprises establishing a mixture of liquid and sludge in an accumulation zone for sewage, introducing sewage into said zone to form a mixed liquor therein, segregating a clarified liquid in a segregated space submerged within said accumulation zone, said segregated space being in open communication with the atmosphere and with said mixed liquor in the lower portion of said zone whereby a common liquid level is maintained within and without said segregated space, separating a clarified liquid from the mixed liquor in said segregated space by passage through a filtering medium, discharging clarified liquid from the segregated space for final disposal through an outlet maintained continuously submerged in segregated clarified liquid and passing air into said mixed liquor in said accumulation zone in quantities to effect at least a partial flocculation of solid matter.

7. A process according to claim 6 in which a treated mixed liquor is continuously admitted to said segregated space which is submerged within said accumulation zone and clarified liquid is continuously discharged from said segregated space.

8. A method according to claim 6 in which a treated mixed liquor is intermittently admitted into said segregated space at a point intermediate the liquid level in said segregated space and an outlet from said segregated space and clarified liquid is intermittently discharged from said segregated space.

9. A process according to claim 6 in which said accumulation zone has a bottom portion providing a volume sufficient for complete containment of settleable sludge and an upper portion providing a volume for handling sewage being introduced into said accumulation zone and passing of air into said mixed liquor is periodically arrested for a time sufficient for settling solids into the bottom portion of said zone and a clarified liquid is withdrawn from said upper portion of said zone to said segregated space for discharge from the system after each periodic arresting of introduction of air.

10. A process according to claim 6 in which clarified liquor accumulated in said segregated space flows thereto through a filter media positioned within said segregated space.

References Cited

UNITED STATES PATENTS

| | | | |
|---|---|---|---|
| 1,247,540 | 11/1917 | Jones | 210—14 |
| 2,822,329 | 2/1958 | Griffith | 210—14 |
| 3,126,333 | 3/1964 | Williams | 210—15 |

FOREIGN PATENTS

| | | |
|---|---|---|
| 1,282,768 | 12/1961 | France. |

OTHER REFERENCES

Aerobic Oxidation, 1956, Reinhold, New York.

Cronan, C. S.: Treater Counters High B.O.D. Waste Streams, Chemical Engineering, vol. 64, April 1957, pp. 186–187.

Kountz I.: Dairy Waste Treatment Pilot Plant, Proceedings of the Eighth Industrial Waste Conf., Purdue Univ., 1953, pp. 382–386.

Kountz II.: Dairy Waste Treatment Plant Design, appearing on pp. 356–359 of Biological Treatment of Sewage and Industrial Wastes, edited by McCabe and Eckenfelder, vol. I.

Porges, N.: Dairy Wastes—Disposal by Balanced Biochemical Bio-Oxidation, 8-page reprint from Dairy Engineering, September and October 1958, The Leonard Hill Technical Group, Leonard Hill House, Eden Street, London, N.W.I. (copy in group 171.)

MORRIS O. WOLK, *Primary Examiner.*

MICHAEL E, ROGERS, *Examiner.*